INVENTOR.
EUGENE E. GARFIELD
BY Arthur H. Seidel
ATTORNEY

INVENTOR.
EUGENE E. GARFIELD
BY Seidel & Gonda
ATTORNEY

United States Patent Office 3,512,129

Patented May 12, 1970

3,512,129 CHARACTER RECOGNITION SELECTIVE COPYING AND REPRODUCING APPARATUS

Eugene E. Garfield, Swarthmore, Pa., assignor to Institute for Scientific Information, Philadelphia, Pa., a corporation of Pennsylvania Continuation-in-part of application Ser. No. 318,685, Oct. 24, 1963. This application Sept. 7, 1966, Ser. No. 598,529

Int. Cl. G06r 9/00

U.S. Cl. 340—146.3 2 Claims

ABSTRACT OF THE DISCLOSURE

Copying apparatus comprising a hand manipulatable scanning device for selectively reading and copying, character recognition apparatus connected to the scanning device, and character reproducing means such as a typewriter connected to receive the output signal from the character recognition apparatus and reproduce the same in printed form.

This is a continuation-in-part of our copending application Ser. No. 318,685, filed Oct. 24,, 1963, now abandoned.

In general, this invention relates to a new and improved selective copying apparatus capable of character recognition and more particularly to a character recognition selective copier utilized in combination with an automatic typewriter for selective copying and verifying.

In U.S. Pats. 3,052,755 and 3,064,078 and in copending patent application Ser. No. 301,293 filed Aug. 12, 1963, now Pat. No. 3,318,966, issued May 9, 1967, entitled "Copying and Reproducing Device" filed by Eugene Garfield and Lawrence Lutzker, there has been disclosed a general method for selectively copying characters, words or phrases. One of the prime differences between the method of copying of documents disclosed in the above mentioned references and other methods is the fact that these latter methods require the documents to be brought to the machine. Further, these other methods require that primarily only an entire page be copied rather than a small portion thereof. Even in the case of portable photocopying machines, normally the document must be fed through rollers or in some way inconvenient to the user be removed from immediate view. The above-mentioned references and the present invention utilize apparatus which enables one to copy selectively while continuously permitting one to view and examine the portion of the document immediately preceding or following that which is copied. This human factor is extremely important in several situations, not the least of which is the research library where one would like to make small extracts from books, periodicals, etc. Another important virtue is the basic efficiency of a selective copier in comparison to the standard facsimile systems where it is necessary to use valuable transmission time to copy long areas of white space. Indeed, on the average, at least 50% of such transmission time is wasted to copy space between lines.

While the selective copying method described in the above-mentioned references is more than adequate for most situations, the methods employed only produce an exact facsimile of the original letters or words copied. In many situations, such as copying a signature, this is highly desirable. However, with the growth of the use of data processing equipment, it becomes desirable in certain situations to copy from written or printed documents, not in analogue form, but rather in a digital form. For example, if I copy the word "rose" in analogue form, it is not possible to further process and manipulate this information on a computing device unless the signal is somehow digitalized, that is, converted to machine language.

The invention disclosed herein concerns special application of selective copying to those situations where the signal generated must be analyzed so as to provide recognition of the individual characters of the alphabet involved.

It is once again important to point out that there are existing devices which permit the copying of documents or parts of documents by the recognition of a character copied for transfer to digital computers. However, all of these systems require that the document be brought to the machine generally passing over some roller feed device. An example of this is the Farrington Automatic address reader utilized by the U.S. Post Office. This last-mentioned character recognition apparatus has a decided disadvantage, not only because there are situations where it is impossible to utilize the apparatus (books) but also because the intervention of a human editor becomes impractical. This means that these character reading machines require extremely involved logical circuits which must account for the many ambiguities present in English and foreign texts. In effect, this means that they must be not only character reading machines but also word reading machines. In the present invention, these difficulties are avoided because the human operator of the selective reading device is able to interrupt the copying process whenever such ambiguities arise. An example of a non-ambiguous situation that is also overcome by utilizing a human operator is the hyphen (-) at the end of a line of printed material.

Another important advantage of the method and apparatus described herein is that it permits the use of a plurality of reading heads with associated buffer circuitry to take advantage of the high speed of recognition possible with a single modern computer.

Selective copying utilizing the system of the present invention eliminates all of the costly hardware required for transporting documents and also expensive logical circuitry resulting from skew and other paper feeding inconsistencies.

The present invention, in a preferred embodiment, is directed to the art of preparing typewritten documents, reproducing selected portions of said documents, and the proofreading or verification of the information contained therein. However, it is intended to be generically applicable to all types of typewriters and other data processing equipment where the selective reproduction of information is a critical factor. The basic invention consists of a typewriter, a logical character recognizing and/or data recognizing unit, and a detachable portable reading unit which can be either mounted over the platen of the typewriter, or, when detached, held in the hand for scanning documents. The apparatus of the present invention has a degree of flexibility impossible in existing copying and reproducing apparatus. For example, the copying embodiment of the present invention will save writers, researchers, attorneys, etc. many hours of wasted effort presently required for the retyping of extensive documents, particularly where only a small percentage of the words in manuscripts must be changed.

In fact, research investigations have determined that in the average retyping of so-called rough drafts, less than 10% of the words in the original manuscript are affected in subsequent drafts. Thus, in the preparation of the average manuscript, the second typing involves a repetition of 90% of the original text. Furthermore, a careful examination of the so-called changes in manuscripts reveals that a significant percentage of these changes are merely the alteration of the syntax of the words previously used. Further, there is frequently the necessity to move one paragraph forward or backward in the original document without any basic changes in the paragraph involved. In the present invention, the selective reading device described in the above-mentioned references would be combined with a typewriter so that copying could take place as before, but the insertion of a new word would be done by typing on the same unit which had produced the original manuscript.

For the purpose of illustrating the invention, there are shown in the drawings forms which are presently preferred; it being understood, however, that this invention is not limited to the precise arrangements and instrumentalities shown.

Figure 1:
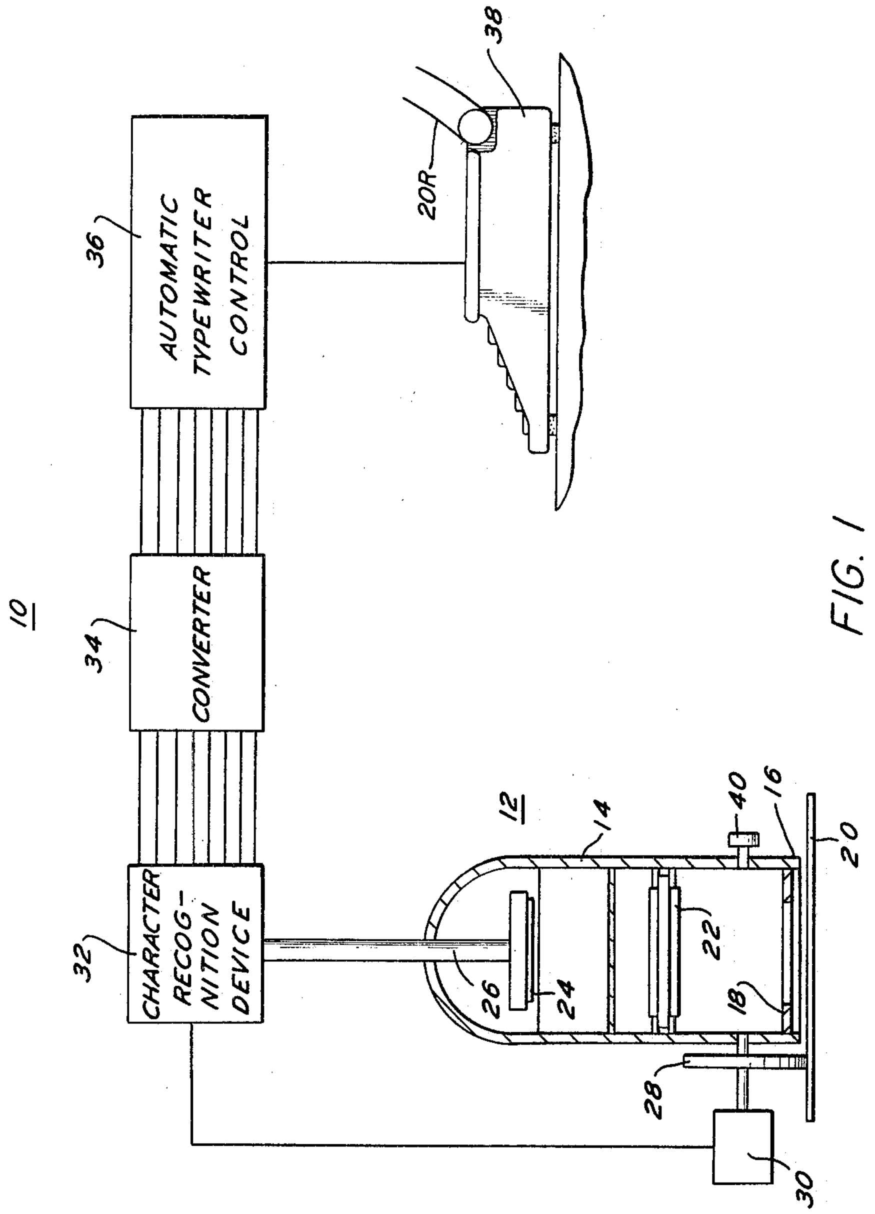
FIG. 1 is a schematic illustration of the apparatus used for performing the invention.

In the drawing, there is shown the apparatus of the present invention generally designated by the numeral 10. The apparatus 10 includes a selective reading device 12 more completely described in co-pending patent application Ser. No. 301,293 filed Aug. 12, 1963 entitled "Copying and Reproducing Device" by Eugene Garfield and Lawrence Lutzker.

The selective reading device 12 has a housing 14 with an open bottom end 16. Adjacent the bottom end 16 there is provided a suitable mask 18 which defines a longitudinally extending opening. The open bottom end 16 is adapted to pass over written material 20 such as a typewritten page. The image on the typewritten page will pass under the mask 18 and be transmitted through a suitable focusing lens system 22 to a strip of photocells 24. The strip of photocells 24 is a coated strip with individual photocells connected to a bundle of wires 26 which pass out of the housing 14. The bundle of wires 26 is in the form of a flexible conduit. Thus, each of the photocells on the strip 24 will provide a signal determinative of the light received thereon in accordance with the information passing under the mask 18. The operation of the reading device 12 is more fully described in the above-mentioned patent application. The reading device 12 includes a suitable speed device 28 which provides a pickup for determining the speed of movement of the reading device 12 across the printed matter 20. The pickup 28 rotates a suitable digital pulse generator 30 which will produce digital pulse signals in accordance with the speed of the reading device 12.

The flexible conduit 26 is connected to a suitable character recognition device 32 which will receive the signals from the photocell strip 24 to determine the letters passing under the mask 18. The digital pulse tachometer 30 transmits a speed signal to the character recognition device 32 so that the character recognition device can be synchronized with the operation of the reading device 12. This synchronization is only desirable when the character recognition apparatus is unable to effectively operate with a speed-of-scan signal. With the parallel readout achieved by the selective reading device 12 it is possible to utilize only the changes between black and not black to determine a character read out. Such operation would eliminate the need for the speed of scan signal. In either operation, the present invention has obviated the need for special feeding apparatus as was necessary in prior character recognition machines. The character recognition device 32 can be a "Demon" character recognition device manufactured by the Rabinow Engineering Company, Inc., Rockville, Md., the operation of which is described in "Optical Character Recognition" edited by George L. Fischer, Jr., Donald K. Pollock, Bernard Radack, and Mary Elizabeth Stevens, 1962, Spartan Books, pages 27–50. The character recognition device 32 will recognize each of the letters on the printed page 20 as the mask 18 passes thereover. The character recognition device 32 can be a simple device capable of recognizing only one standard type of typewriter font. In the alternative, a more sophisticated character recognition device could be substituted which would recognize all types of fonts such as italics, and provide an output determinative of the character recognized.

The output signal of character recognition device 32 is an eight line character code in digital form conforming to the new ASA standard Information Interchange Code developed by their subcommittee X3.2 on coded character sets and data formats, or any other digitalized output with a code compatible with the typewriter apparatus used in subsequent steps.

The output of the character recognition device 32 is fed through a converter 34 which converts the digital logic signal of the character recognition device 32 into an eight line digital output signal capable of being utilized by an automatic typewriter control 36. The converter 34 can be a Universal Dura Converter manufactured by the Dura Business Machines Corporation and the automatic typewriter control 36 can be the Automatic Letterwriter Mach 10B manufactured by the same company. The automatic typewriter control 36 will control the operation of a standard electric typewriter 38. The typewriter in the present invention would, of course, be able to include a version which simultaneously produced a paper tape or other machine readable output in those applications where this additional feature would be desirable.

One use and operation of the apparatus 10 of the present invention would be, in a typical situation, as follows:

A blank sheet of paper 20R is inserted in the platen of the typewriter 38 as is normally done with a conventional typewriter. A new version of an original manuscript 20 would be reproduced by moving the hand held reading unit 12 horizontally across each line of the original manuscript, that is, for English typewriters from left to right—for others, right to left. The character recognition device 32, receiving a synchronizing signal from the digital pulse tachometer 30 and image signals through the conduit 26, produces output digital signals for use by the converter 34 in accordance with the characters recognized. The converter 34 will transform the language of the character recognition device 32 into a form acceptable by the automatic typewriter control 36, such as an eight line digital output signal, so that the typewriter 38 will type the characters read by the unit 12.

If a rough draft were being produced, one of the immediate advantages of the proposed invention is that corrections could be made by merely striking out with an *x* or a special character any errors made by the typist. This is in contrast to the requirement of erasing errors and/or correcting by-product paper or magnetic tapes in related applications, which all but eliminates their practical use for manuscript work. After the page is reproduced, the new copy 20R is removed from the typewriter and is given to the author for examination. The author can make the corrections he would ordinarily insert in a manuscript of this type. However, he would ordinarily try to be careful not to mark any words which were, in fact, correct since any additional marks on the typewritten characters might effect the subsequent reading of these characters by the character recognition device 32, unless a special ink or pencil were used. After the original manuscript is proofread by the author, it is sent to the typist who then does the following:

A new sheet of paper 20R is inserted in the typewriter. The portable and detachable reading unit 12 is manually passed horizontally over the typewritten sheet 20R, that is, the reproduced version of the original manuscript. This step could be expedited by the use of a small guide box in which the rectangular sheet is inserted to facilitate the even movement of the reading unit across each line. This would minimize the skewing effect that might be produced by the operator using the unit without any guide at all. However, the scanning unit can be held in the hand and moved across the manuscript without a guide. If, for example, the first sentence has no changes in it, as each individual character passes under the mask 18 of the reading unit 12, the character will be transmitted to the recognition device 32 and upon suitable recognition, electrical impulses will be transmitted back to the typewriter 38 and the same letter will be actuated on the typewriter 38. The result of scanning the typewritten lines is to produce a duplicate on the typewriter of the material typed on 20R. In this part of the operation, it must be stressed that the typist is not striking keys on the typewriter but is only scanning document 20R with the selective copying device 12. Thus, the speed of operation is only limited by the speed which the hand moves across the page, the speed of the typewriter, and the number of changes requested by the author.

When the operator comes to a correction in the original manuscript, such as a crossed out word, it is only necessary to lift the reading unit 12 from the page, pass over the crossed out word, and then reposition the scanning unit on the next word to be read. Additional correct words are copied until another correction change is encountered as, for example, the insertion of a new word. At this point, the operator will possibly have to strike the space bar, type in the new word, strike the space bar again, and resume the scanning of the original document with the reading unit 12. Suppose now that the editor's instruction is to jump from one sentence over the next paragraph to a succeeding paragraph. The operator simply lifts the reading unit 12, moves down to the next paragraph and begins the scanning process again. After the sentence or paragraph is automatically retyped, the operator can then go back to the previous paragraph and type it in its correct order utilizing the reading unit 12. Thus it can be seen that the basic manual retyping operation is limited almost exclusively to new or corrected words. Since it will be such a frequently occurring event, an additional button 40 can be provided on the reading unit 12 which will automatically actuate the space bar and will save the trouble of going back to the typewriter where additional spaces may be needed. Similar controls, such as carriage return, might also be provided.

While it is obvious that in many applications the speed of the operation described is a central feature, it is to be stressed that a more significant advantage of this system is the accuracy involved which will not require complete rereading of the revised manuscripts by the authors. This is by far the most expensive aspect of the time consuming process of revising manuscripts since it is usually not possible to be certain that the typist has, in fact, retyped an already proofread manuscript exactly as corrected by the author.

To increase the speed of operation, it is possible to have the output of the character recognition device 32 fed to a plurality of buffer units which would store information until the automatic typewriter control 36 can receive the information. Thus, the speed of movement of the reading unit 12 would not be limited by the speed of operation of the typewriter. Further, other actuation means could be utilized with the reading unit 12 to provide a carriage return or tabulation signal for control of the automatic typewriter.

It should be stressed that the primary application of this invention is with typewriter units where a special stylized font is used, such as the Farrington font, which will permit the logical recognition circuitry to be of the most simple kind since there is no ambiguity between any of the characters in this font. However, by the use of more sophisticated character recognition techniques, the reading unit 12 could in fact, be used to read manuscripts which had not been originally typed on the same typewriter 38 which is actuated by the apparatus of the present invention.

In the data processing field, there is an additional significant problem where proofreading is not done by sight. In other words, the data is frequently of a type consisting of numbers or alpha-numeric codes where it is impractical to visually read such information and compare it to an original for extended periods of time. For this reason, the dominant method of preparing basic records in most data processing systems is to use key-punch machines which produce punch-cards. In the typical key-punch situation, the original data are typed on a keyboard similar to that found on typewriters with the minor exception that the upper case characters are generally used exclusively and the numerals are located on different keys. As the key-punching or typing operation proceeds, a preforated punch-card is produced which contains a coded representation of the information obtained from the original source document. The printed representation of the individual character may or may not simultaneously be printed at the top of the column concerned.

The method generally used to check the accuracy of this so-called key-punching operation is to take the original source document to another operator and machine called a verifier. The perforated cards are then inserted in this verifying machine and essentially the same operation is performed by the operator of the verifier as was performed by the key-punch operator. This procedure is based on the generally correct assumption that the same error will rarely be made twice by two different people. Thus, if the verifier encounters a mistake in the punched card, a red light appears on the verifier machine indicating that there is a discrepancy between the original typing operation and the one presently involved. While there are definite advantages to the key-punch method, there are many decided disadvantages which are overcome by the invention above described. One of the most important limitations of the key-punch operation is the requirement that expensive space-consuming punch cards be employed. A similar disadvantage is found when using typewriters which produce, instead of punch cards, perforated tapes, since the tapes also are space consuming and cumbersome. A prime limitation of the punch card is the fact that only eighty characteris can be stored on the card, whereas the average 8½" by 11" typewritten sheet can contain approximately three thousand characters or as many as five thousand depending upon the spacing involved. Another disadvantage of the punch card operation is the error correction routine. When an error is detected in a punched card, the card must be removed from the deck. The correction is then noted in pencil on the card and the card must be returned with the original document to the key-punch machine. Here, the old card is inserted in the key-punch, duplicated up to the point of the error, and then the remainder of the card has to be repunched, particularly if there is a change in the spacing arrangement. As will be seen in the description of the verification procedure, with the apparatus of the present invention, this cumbersome step is also eliminated.

Utilizing the teachings of the present invention, an original blank sheet is inserted in the typewriter and the data are typed onto it in a straightforward fashion as is generally done. The typing operation, incidentally, is also superior to the key punching operation as at the time when the typist makes a mistake, she immediately recognizes it as a mistake utilizing the typewriter. This is because she can see the mistake being typed whereas in the key punching operation, the operator does not see the mistake. In the key punching operation, it is necessary to reduplicate the whole card when a single letter is punched incorrectly. In the operation discussed above it is possible to erase incorrect data and insert the correct information. This can be done without removing the entire sheet. If desired, lengthy corrections can be typed on the preceding line of a double or triple spaced manuscript.

Figure 2:
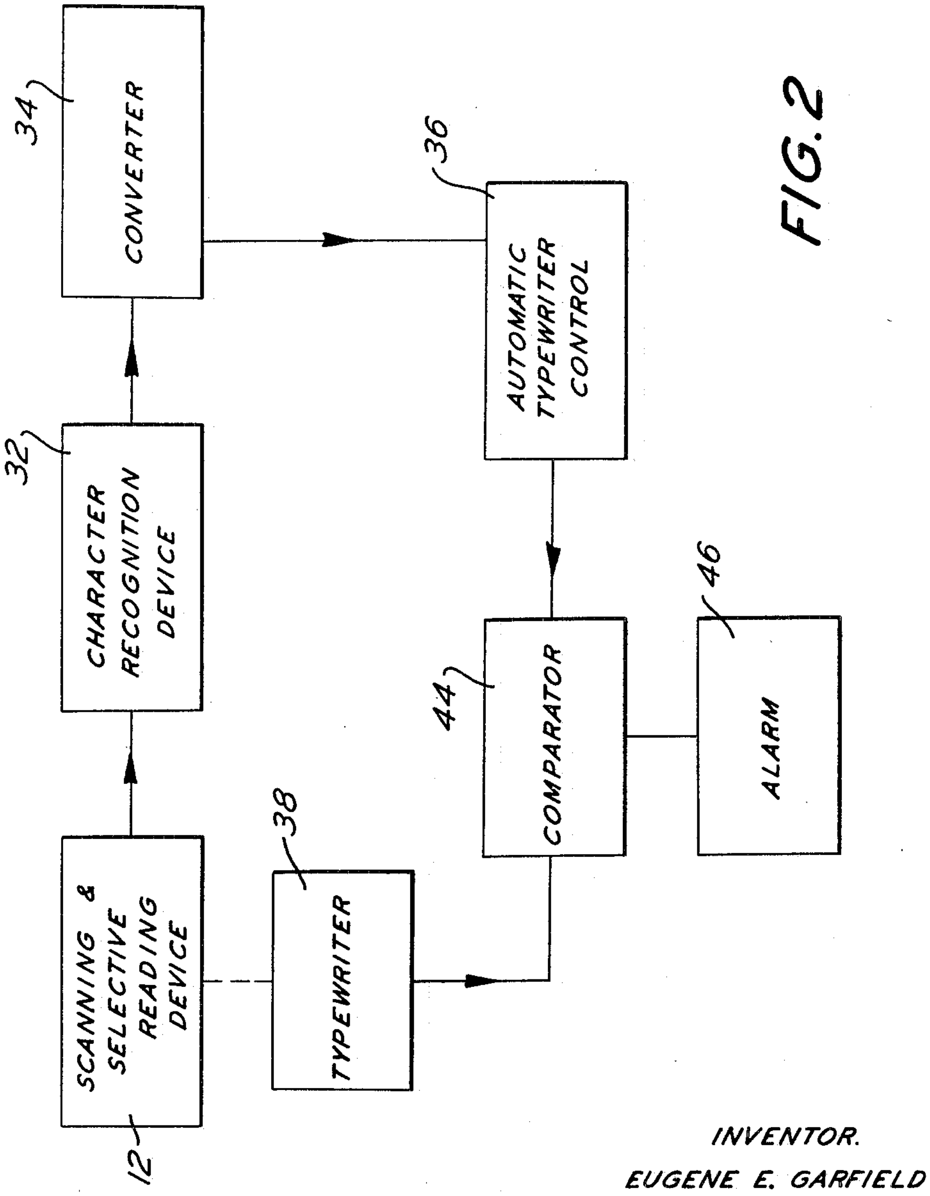
FIG. 2 is a partial schematic illustration showing the modifications to FIG. 1 for performing the invention.

A typical use of the apparatus 10 for the verification procedure, as illustrated in FIG. 2, is as follows:

After the first draft of the original manuscript is typed, the typed manuscript is placed in the typewriter. The original manuscript is placed so that the operator can conveniently begin the verification procedure. The operator then sets the typewriter 38 so that the print is suppressed; that is, the keys may strike but nothing is printed because the inked ribbon is not in position, or the keys may not even be caused to strike. The operator then types on the keys of typewriter 38 as he reads from the original. The first typed copy is in the platen of the typewriter. The reading device 12 is positioned on the typewriter 38 adjacent to the point where the typing normally occurs. Since printing has been suppressed, the reading device 12 is free to be positioned on the tyepwriter without interfering with the operation of the system. The typewriter 38 is adapted so that typing on its keys produces an electronic signal indicative of the particular key that has been struck. Thus, the operator's typing is producing a first set of signals corresponding to the particular keys being struck. Since the reading device 12 is positioned adjacent the point where typing would normally occur, it is therefore simultaneously reading the material printed on the first prepared copy. The output of the reading unit 12 is conducted to the character recognition device 32, from there to the converter 34 and then to the automatic typewriter control 36 as heretofore explained. However, as shown in FIG. 2, the automatic typewriter control is connected to a comparator 44 rather than to the typewriter 38. The signal produced by striking the individual keys of the typewriter 38 is also conducted to the comparator 44.

If the two signals arriving at the comparator 44 are identical, then nothing occurs since this is indicative that there is no error in the original manuscript. However, if the two signals are different, then the comparator will signal the existence of such a difference. This, in accordance with the theory outlined above, indicates that there is an error either in the first prepared copy or in the particular key struck, which can be determined either by examining the typed version or by checking the original manuscript.

During the verification operation, typing errors which have been superimposed by an *x* placed on the first prepared copy simply will not be recognized by the character recognition device 32. Thus, only real characters, and a character superimposed with an *x* over it is not a real character, will be recognized and transmitted to the automatic typewriter control 36. A special solid character can also be created to produce a solid black mark or a special symbol designating an error, can be used. In the operation described above, the comparator 44 can be any well known electronic circuit that will recognize the presence of two substantially like electronic signals.

In a similar fashion, the original manuscript could be placed in the typewriter platen so that the typist could type directly over it while the character reading selective copying unit 12 was placed over the to-be-proofed copy in the rectangular box. Detected errors would thus also be recognized, and it would not be necessary to use a non-print key and the new draft would never be touched. Indeed, this principle can be extended so that the reading unit 12 need never be placed over the platen for models of typewriters where this might not be convenient. The essence of a proofreading or verification procedure is to obtain two simultaneous input signals—one from each of the two documents being compared. It makes no basic difference which of the two is read on the typewriter or off the typewriter. Indeed, by a logical extension of this invention, two reading units such as 12 might be simultaneously employed to achieve the proofreading function, one on the typewriter and the other in the reading box.

In that way, a single operator could still handle the work but would not have to do any keying but merely advance the document one space at a time by depressing the space bar. One reading unit would convey a signal to the comparator from the platen and the other reading unit would convey a signal to the comparator from the box. A mismatch would alert the operator to any discrepancy in the two documents. This type of verification procedure could be employed not only for normal verification, but could also be employed by someone who had just reproduced a second or third generation manuscript and wished to be certain that all lines had been copied. Such a redundancy procedure would eliminate the common error of skipping an entire line during the preparation of a new version.

The employment of a second reading unit would also permit the introduction of yet another redundancy feature in the course of any retyping. Any electric device may produce the wrong character either because it has been misread or miskeyed. Now as each character is typed, the reading unit on the platen can be reading the character after it is typed, comparing it to that which was read.

The present invention makes possible the practical utilization of the retyping operation for character by character verification. As each character is typed, the character in the original script is being read and compared with the key depressed at the typewriter. If a discrepancy occurs, then a signal comparator 44 can be utilized to indicate such to the operator. If only a single character in a word is incorrect, it can be immediately corrected. This can be done by a number of methods including simple erasure or by an operation well known in graphic arts procedures as "morticing" in which one or more erroneous characters are replaced by correct letters by a cut and paste operation.

This apparatus is also applicable to the letterpress printing industry as it would facilitate the process of correcting manuscripts. By utiliing the present invention in the letterpress printing industry, it will be possible to go directly from corrected manuscripts to Linotype or Monotype composition.

While standardization of the typographical fonts either produced by the typewriter or read by the reading unit is obviously desirable for design simplification, it should be recognized that the character recognition unit could read a font quite different from that produced by the typewriter itself. In other words, one might selectively copy the printed words in this specification so as to incorporate the words in a typewritten document which subsequently could be scanned by the same or another reading unit so that each document is only an intermediate phase of a total document handling system. The typical cycle might involve selective copying from books or patents interspersed with manually typewritten notes. A first manuscript could then be proofread and/or verified and a new or improved manuscript quickly reproduced which could then be read by another reading unit in an editorial office to produce a new manuscript, perhaps with narrower margins. Finally, by use of the same or another reading unit a Monotype, Linotype or other priting device could be actuated so as to produce a final printed page with an absolute minimum of retyping and reproofing. This process obviously will be facilitated to the extent that in the future, more published documents will be printed with unambiguous type fonts, so as to minimize the complexity of the necessary character recognition circuits. Any type of character reading unit could be included, even those which can read hand drawn as well as printed characters. It should be noted that the ambiguity of many type fonts mentioned above is not with respect to ambiguities illustrated by the letter *l* and the numeral 1 which are ordinarily on the same type key in a standard typewriter. In this particular invention, that type of ambiguity presents no problem whatsoever since the only purpose of the device is to recognize a character regardless of its meaning. There are, however, other possible ambiguities which make it more difficult for a particular recognition device to differentiate between two characters with different meaning. Fortunately, these stylized fonts do not present a problem in the standard typewriter.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for verifying copy comprising means for generating a first electric signal corresponding to the characters on a copy of the manuscript to be verified, means for simultaneously optically scanning the copy being verified and producing a second electric signal corresponding to the character scanned, and means for simultaneously comparing the electric signals produced by scanning said copy being verified with said first electric signals and indicating when a difference between said signals is present.

2. A method of verifying copy comprising the steps of verifying a copy of a manuscript by mechanically retyping the manuscript using a character reproduction device to produce only an electric signal corresponding to the retyped copy, simultaneously optically scanning the first-mentioned copy, producing an electric signal corresponding to the character scanned, said step of optically scanning including optically scanning the written matter on the first-mentioned copy character by character and recognizing each character as it is individually scanned, comparing the signals produced by scanning the first-mentioned copy to signals produced by typing the copy on said character reproduction device, and indicating discrepancies between the signals so produced.

References Cited

UNITED STATES PATENTS

| | | | |
|---|---|---|---|
| 1,976,615 | 10/1934 | Jones | 73—156 |
| 2,518,694 | 8/1950 | Jannopoulo | 340—146.3 XR |
| 2,714,201 | 7/1955 | Whitehead | 340—149 |
| 2,978,977 | 4/1961 | Eckert et al. | 340—146.1 |
| 3,177,470 | 4/1965 | Galopin | 340—146.3 |
| 3,205,480 | 9/1965 | Simjian | 340—146.3 |
| 3,390,253 | 6/1968 | Miller | 235—61.7 |
| 2,930,899 | 3/1960 | Lyon et al. | 250—233 |
| 2,964,734 | 12/1960 | West | 340—149 |
| 3,133,266 | 5/1964 | Frishkopf | 340—146.3 |
| 3,165,717 | 1/1965 | Eckelman et al. | 340—146.3 |

THOMAS A. ROBINSON, Primary Examiner

U.S. Cl. X.R.

235—61.7; 340—149